Patented Jan. 19, 1943

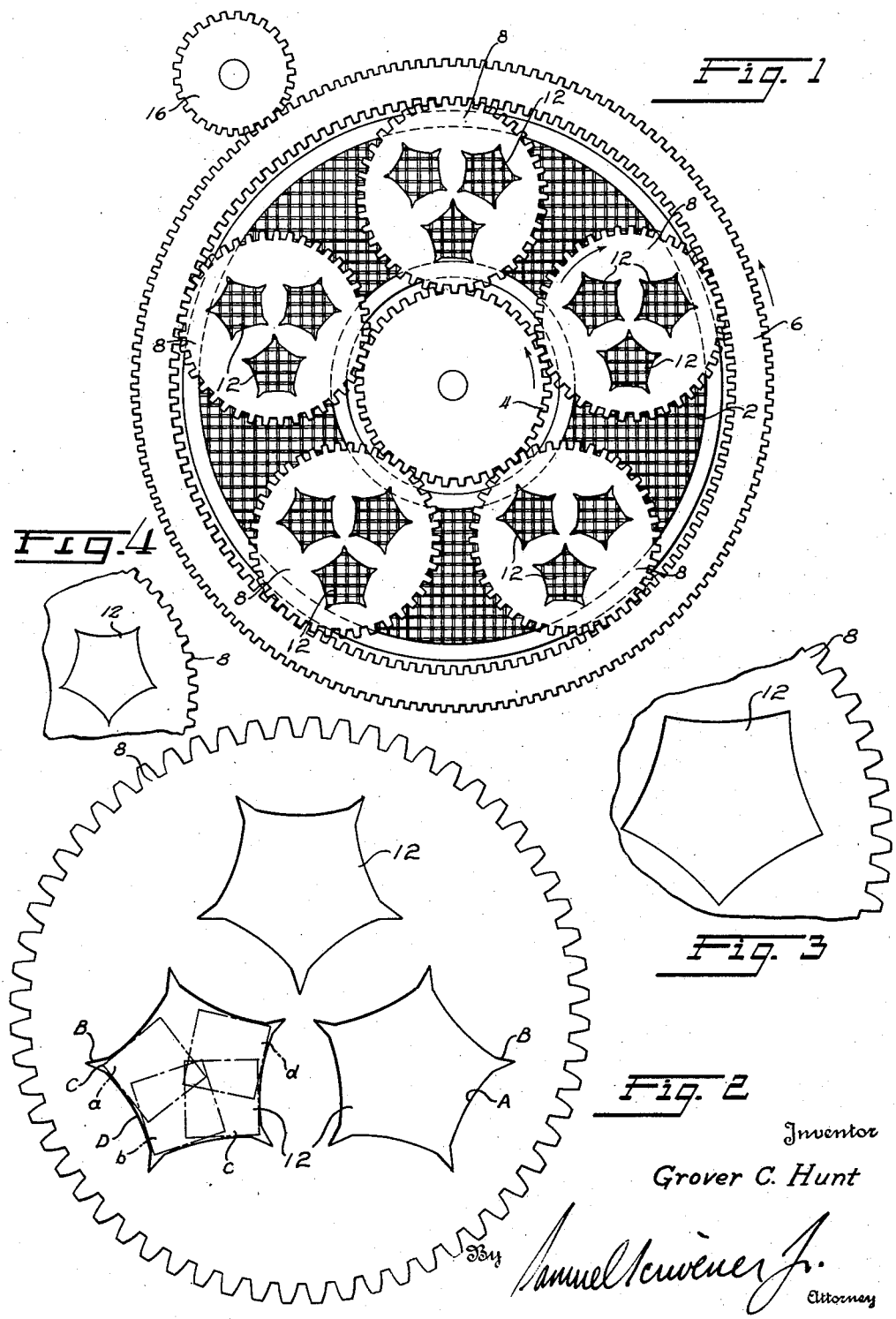

2,309,080

UNITED STATES PATENT OFFICE 2,309,080

WORK HOLDER FOR GRINDING MACHINES

Grover C. Hunt, Carlisle, Pa.

Application December 6, 1941, Serial No. 422,002

7 Claims. (Cl. 51—237)

This invention relates generally to devices for holding articles, such as piezo-electric crystals, while such articles are being ground. More particularly, the invention relates to work holders for holding polygonal crystals the opposite faces of which are being ground in a machine of the type having fixed upper and lower abrasive surfaces, a pinion gear disposed centrally of the discs, a ring gear concentric with the pinion, and one or more circular work holders provided on their outer peripheries with gear teeth which mesh with those of the pinion and ring gear, whereby each work holder is caused to move in a planetary path about the pinion and to simultaneously rotate about its own axis when one or both of the pinion and ring gears are rotated. A grinding machine of this type and with which the work holder of this invention is particularly useful is disclosed in my co-pending application Serial No. 422,001 filed December 6, 1941.

Work holders of the general type to which this invention relates are known in the grinding art and each comprises a circular body having gear teeth on its outer periphery and having one or more openings in the body thereof within which the articles being ground are positioned during the grinding operation. These openings have usually been of circular shape and there has been no teaching in the art with respect to the relation of the shape of the opening to the shape of the work piece which is productive of optimum results. While my work holder is of general utility and may be used with work pieces of any shape it is particularly intended and adapted for use in the grinding of rectangular, preferably square, piezo-electric crystals and in this application it will be described and illustrated with reference to such crystals.

An object of the invention is to provide a work holder of the type described having work-holding openings therein which are so shaped that during operation of the machine including the work holder the work pieces held thereby are caused to move in a predetermined path about the opening itself in addition to the movement of the work pieces due to the usual planetary and rotary movements of the work holders, thereby giving an increased grinding action.

Another object of the invention is to provide a work holder of the type described having work-holding openings therein which are so shaped that when used in the grinding of rectangular crystals any breaking of the corners of the crystals by reasons of jamming in the corners of the opening or coming into contact with the sides of the work-holding openings will be entirely prevented.

Other objects and features of novelty of the invention will be made apparent by the following description and the annexed drawing, it being understood, however, that the invention is not limited in any way by such description and drawing or otherwise than by the appended claims.

Referring to the drawing, in which the same reference numerals and letters refer to like parts:

Fig. 1 is a plan view, on a reduced scale, of a machine in which the work holder of this invention may be used;

Fig. 2 is a plan view, in full scale, of a work holder formed in accordance with the invention and showing schematically certain of the various positions assumed by a work piece during operation, and Figs. 3 and 4 are, respectively, fragmentary plan views of work holders according to the invention and having openings of different shapes therein.

In Fig. 1 of the drawing there is illustrated in plan view a grinding machine constructed and preferably operable in the same manner as that disclosed in my aforesaid co-pending application. This machine comprises a fixed lower abrasive disc 2, a pinion gear 4 which is disposed centrally of and concentrically with the disc 2, a ring gear 6 which is concentric with the pinion and surrounds the disc and has gear teeth on its inner and outer surfaces, and work holders 8, each having external gear teeth which mesh with those on the pinion and those on the inner surface of the ring gear. A fixed upper disc (not shown) is adapted to be received within the ring gear and to rest on the lower disc or on work pieces positioned between the two discs. The pinion gear is driven by suitable means (not shown), while the ring gear is driven by driving gear 10.

It will be apparent that upon rotation of one or both of the pinion and ring gears the work holder 8 will travel bodily in a planetary path about the pinion gear and will simultaneously rotate about its own axis. In the preferred method of operation of my invention, as disclosed in my aforesaid co-pending application, the ring gear is driven in the same direction as the pinion and at a speed less in R. P. M.'s than that of the pinion, whereby work pieces held by the work holder will be caused to depart from a normal cycloidal path and will follow a path which is illustrated in the aforesaid co-pending application, all in the manner and with the advantages described in said co-pending application.

Means are provided by this invention for giving to the work pieces held by the work holder a movement in addition to that due to the usual, described movement of the holder. Such means are found in the shape given to the openings in the work holder within which the work pieces are positioned. As shown in Fig. 2 each work holder is provided with a plurality of openings 12 each of which is generally pentagonal in shape. Each side of each opening is curved inwardly toward the center of the opening in a generally arcuate shape having a radius which, if a square crystal is being ground, is preferably 1½ to 2 times the length of a side of the crystal. The chord length of each side of the opening is preferably slightly greater than the length of a side of the crystal.

As the work holder moves in the direction of the arrow of Fig. 1 or clockwise as shown in Fig. 2 the wall of the crystal opposite to the direction of movement, i. e., wall C of Fig. 2, will be engaged by a wall, such as D, of the opening. The rotary and planetary movements of the holder and the resistance of the upper and lower discs will co-operate with the curvature of the walls of the opening to cause the crystal to travel about the opening during operation of the machine. Thus, the crystal will move through positions a, b, c, d, etc., of Fig. 2 and will continue to travel about the opening during the entire operation, thus providing an additional grinding effect and by constantly changing the position of the crystal and, in effect, rotating it about its own axis, causing a more uniform grinding than would otherwise be provided.

It has been found that the corners of rectangular crystals have a tendency to break during grinding because of binding in a corner of the opening in the work holder within which the crystal is placed and because of contact between the corners of the crystal and the periphery of the work holder opening. Means are provided by the invention for preventing such breaking and such means are provided by forming each side of each pentagonal work-holding opening as a compound arc having the central arcuate portion A and arcuate or straight end portions of shorter length as shown in Fig. 3 and, if arcuate, as shown in Fig. 4 of lesser radius than the arcuate middle portion. It will be seen that the compound arcuate configuration of the sides insures that the angle at each corner of the opening, i. e., between adjacent sides, will be deep and less than 90°, whereby it will be impossible for the corner of any rectangular crystal to become bound or lodged in the corner of the opening. Further, the compound arcuate configuration of the sides of the work holders opening insures that the mechanical force which propels the crystal will have contact with the crystal at a point other than at a corner and that the corners of the crystal will not come in contact with the work holder in the movement of the crystal around the pentagonal opening. It will be obvious that these advantageous results will accrue if crystals which are of other than rectangular shape are ground, so long as the crystals do not correspond in shape to the opening or have corners including lesser angles than those of the pentagonal opening.

It will be apparent that many of the features and advantages of the invention may be achieved by forming each side of each opening as a simple, inwardly-directed arcuate curve, as shown in Fig. 3 of the drawing, which represents a fragmentary part of a work holder formed according to the invention.

While I have described and illustrated but one form of my invention, it will be apparent that modifications and improvements may occur to those skilled in the art, all of which may be practiced without departing in any way from the spirit or scope of the invention, for the limits of which reference must be had to the appended claims.

I claim:

1. A device adapted to hold a work piece between opposed grinding discs, comprising a circular body having gear teeth on its periphery and having at least one pentagonal opening therethrough within which the work piece is positioned while being ground.

2. A device adapted to hold a work piece between opposed grinding discs, comprising a circular body having gear teeth on its periphery and having at least one pentagonal opening therethrough within which the work piece is positioned while being ground, each side of each opening being curved inwardly toward the center of the opening.

3. A device adapted to hold a work piece between opposed grinding discs, comprising a circular body having gear teeth on its periphery and having at least one pentagonal opening therethrough within which the work piece is positioned while being ground, each side of each opening being curved inwardly toward the center of the opening on the arc of a circle.

4. A device adapted to hold a work piece between opposed grinding discs, comprising a circular body having gear teeth on its periphery and having a plurality of openings therethrough arranged about the center thereof and within each of which a work piece is positioned while being ground, each of said openings having five walls of equal length each of which is curved inwardly toward the center of the opening.

5. A device adapted to hold a work piece between opposed grinding discs, comprising a circular body having gear teeth on its periphery and having a plurality of openings therethrough arranged about the center thereof and within each of which a work piece is positioned while being ground, each of said openings having five walls of equal length each of which is curved inwardly toward the center of the opening on a compound arc.

6. A device adapted to hold a work piece between opposed grinding discs, comprising a circular body having gear teeth on its periphery and having at least one pentagonal opening therethrough within which the work piece is positioned while being ground, each side of each opening being curved inwardly toward the center of the opening on a compound arc comprising a center portion and end portions of lesser radius than the center portion.

7. A device adapted to hold a work piece between opposed grinding discs, comprising a circular body having gear teeth on its periphery and having at least one pentagonal opening therethrough within which the work piece is positioned while being ground, each side of each opening being formed by a central portion which is curved inwardly toward the center of the opening and substantially straight-line end portions.

GROVER C. HUNT.